United States Patent
Mao

(10) Patent No.: US 12,453,363 B2
(45) Date of Patent: Oct. 28, 2025

(54) METHOD FOR PREPARING PERSIMMON LEAF EXTRACT

(71) Applicant: Wude Mao, Guilin (CN)

(72) Inventor: Wude Mao, Guilin (CN)

( * ) Notice: Subject to any disclaimer, the term of this patent is extended or adjusted under 35 U.S.C. 154(b) by 0 days.

(21) Appl. No.: 17/562,677

(22) Filed: Dec. 27, 2021

(65) Prior Publication Data

US 2023/0200421 A1 Jun. 29, 2023

(51) Int. Cl.
*A23L 33/105* (2016.01)
*A23P 10/40* (2016.01)
*B01D 11/02* (2006.01)
*B01D 37/00* (2006.01)

(52) U.S. Cl.
CPC ............ *A23L 33/105* (2016.08); *A23P 10/40* (2016.08); *B01D 11/0284* (2013.01); *B01D 11/0288* (2013.01); *B01D 11/0292* (2013.01); *B01D 37/00* (2013.01)

(58) Field of Classification Search
CPC ............ A23V 2250/21; A23L 33/105; B01D 11/0288; B01D 11/0284; B01D 11/0292; B01D 11/042
See application file for complete search history.

(56) References Cited

FOREIGN PATENT DOCUMENTS

| CN | 102344470 A | * | 2/2012 | |
| CN | 108211417 A | * | 6/2018 | ......... B01D 11/0288 |

OTHER PUBLICATIONS

Lu C et al. CN 101322737 A, Abstract, Machine Translation, English, Dec. 17, 2008 (Year: 2008).*
Zhang et al. CN 108211417 A, Abstract, Machine Translation, English, Jun. 29, 2018 (Year: 2018).*
Spray Drying Nozzles, retrieved online May 31, 2024, pp. 1-8 https://spraydryingnozzles.com/spray-drying-basics/ (Year: 2024).*
CN 102344470 A, Li X et al., English Machine Translation Feb. 8, 2012, pp. 1-2. (Year: 2012).*

* cited by examiner

*Primary Examiner* — Hong T Yoo
(74) *Attorney, Agent, or Firm* — John R. Ross; John R. Ross, III

(57) ABSTRACT

An improved method for preparing persimmon leaf extract. Dried persimmon leaves are obtained and are crushed. Ethanol is added to the dried crushed persimmon leaves and ethanol extraction is used to produce a persimmon leaf extraction solution. The persimmon leaf extraction solution is introduced into a concentrator and a first concentrated solution is produced while the ethanol is recycled. The first concentrated solution is filtered to produce a filtrate. The filtrate is introduced into the concentrator to produce a second concentrated solution. The second concentrated solution is repeatedly extracted with ethyl acetate to produce a second persimmon leaf extraction solution. The second persimmon leaf extraction solution is introduced into a concentrator to produce a third concentrated solution while recycling the ethyl acetate. Vacuum drying is used to dry the third concentrated solution to produce a dried persimmon leaf extract.

7 Claims, 3 Drawing Sheets

METHOD FOR PREPARING PERSIMMON LEAF EXTRACT

The present invention relates to persimmon leaves, and in particular, to methods for producing persimmon leaf extract.

BACKGROUND OF THE INVENTION

Persimmon leaf extract has many highly regarded health benefits. It aids in weight loss, it has anti-cancerous properties and is an immunity booster. Additionally, it provides benefits to the heart, aids in digestion and relieves allergy symptoms.

In the prior art, as part of the preparation process persimmon leaf extract has been produced by passing a persimmon leaf extraction solution through an adsorption resin column for purification. As a result, residual resin is left in the persimmon leaf extract. It is recognized that residual resin is harmful to human health. Also, traditional preparation methods use methanol as an extraction solvent. Methanol is a Class 2 solvent and therefore should be limited in pharmaceutical products and food supplements, when possible, because of its inherent toxicity.

What is needed is a better method for producing persimmon leaf extract.

SUMMARY OF THE INVENTION

The present invention provides an improved method for preparing persimmon leaf extract. Dried persimmon leaves are obtained and are crushed. Ethanol is added to the dried crushed persimmon leaves and ethanol extraction is used to produce a persimmon leaf extraction solution. The persimmon leaf extraction solution is introduced into a concentrator and a first concentrated solution is produced while the ethanol is recycled. The first concentrated solution is filtered to produce a filtrate. The filtrate is introduced into the concentrator to produce a second concentrated solution. The second concentrated solution is repeatedly extracted with ethyl acetate to produce a second persimmon leaf extraction solution. The second persimmon leaf extraction solution is introduced into a concentrator to produce a third concentrated solution while recycling the ethyl acetate. Vacuum drying is used to dry the third concentrated solution to produce a dried persimmon leaf extract.

DETAILED DESCRIPTION OF THE PREFERRED EMBODIMENTS

The present invention provides an innovative, inexpensive, safe and environmentally friendly preparation method for preparing persimmon leaf extract. Persimmon leaf extract prepared by the steps described below can help prevent hypertension, skin disease, can help lower blood pressure, and lower cholesterol.

Using the steps described below, persimmon leaf extract is prepared without having to pass an extraction solution through an absorption resin column. Also, the present invention uses edible ethanol and edible ethyl acetate for extraction solutions. Ethanol and ethyl acetate are Class 3 solvents and are regarded as having low toxicity and low risk to human health. Also, the method described herein results in a high recovery for flavonoid.

Figure 1:
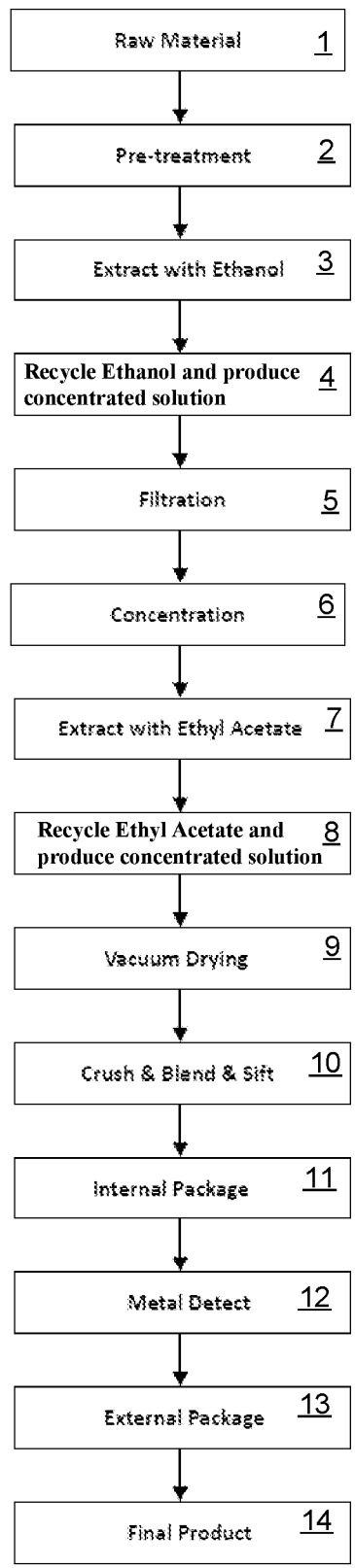
FIG. 1 shows a flowchart depicting a preferred embodiment of the present invention.

FIG. 1 shows a flowchart depicting a preferred method for preparing persimmon leaf extract.

In step 1, the raw material of dried persimmon leaves has been obtained.

In step 2, during pre-treatment the dried persimmon leaves have been crushed.

Figure 2:
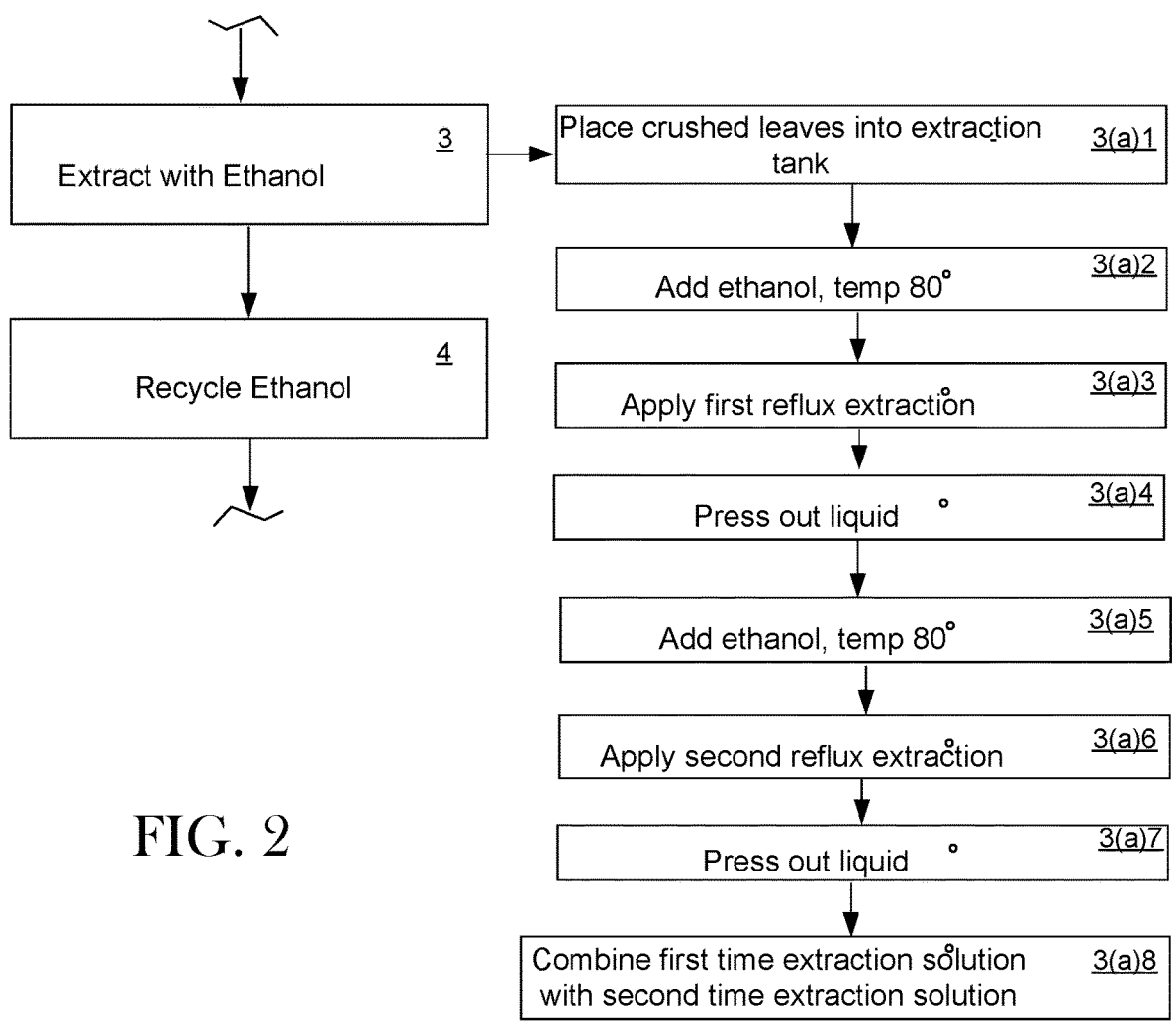
FIG. 2 shows a preferred method for extracting with ethanol.

In step 3, ethanol extraction is used to produce a persimmon leaf extract solution. One preferred embodiment is shown in FIG. 2, steps 3(a)1-3(a)8. First, the dried and crushed persimmon leaves are placed into an extraction tank. Then, 75% (v/v) edible ethanol is added to the dried and crushed persimmon leaves at a ratio of 5:1. The temperature of the mixture is preferably set at 80° C. A first reflux extraction is conducted for 1.5-2 hours. The liquid is then pressed out. Then, 75% (v/v) edible ethanol is added to the extraction solution at a ratio of 4:1 (4 parts edible ethanol to 1 part raw material). The temperature of the mixture is preferably set at 80° C. A second reflux extraction is conducted for approximately 1.5 hours. The liquid is then pressed out. The persimmon extract solution is created by combining the first-time extraction solution with the second-time extraction solution.

Figure 3:
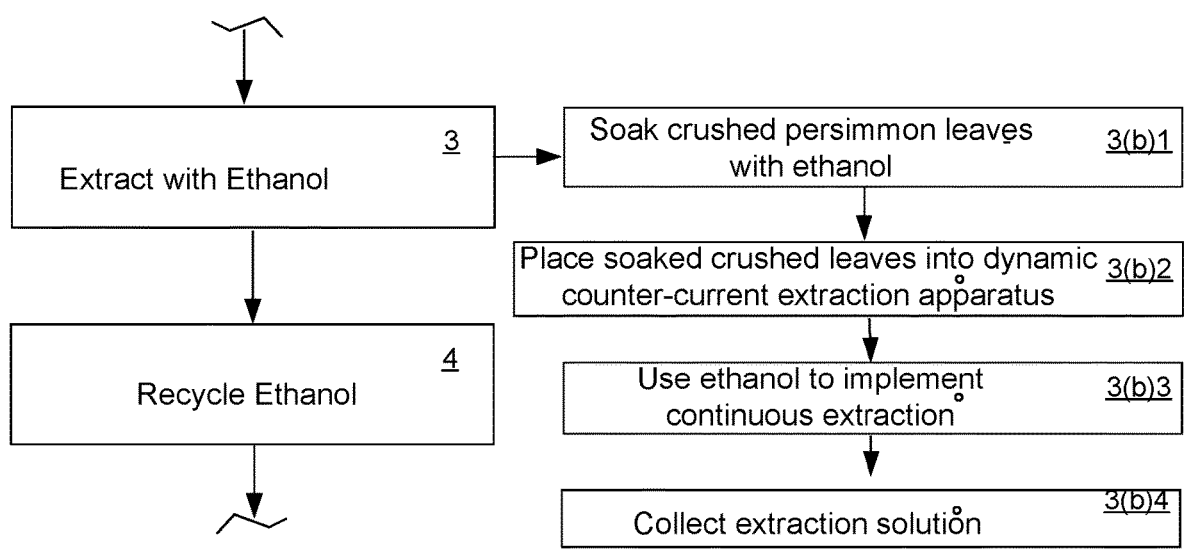
FIG. 3 shows another preferred method for extracting with ethanol.

Alternatively, another preferred embodiment for creating a persimmon extract solution is shown in FIG. 3, steps 3(b)1-3(b)4. Dried, crushed persimmon leaves are soaked with 75% (v/v) edible ethanol. The soaked leaves are then placed into a dynamic counter-current extraction apparatus. 75% (v/v) ethanol is used to implement continuous extraction based on the following preferred parameter: ratio of dried persimmon leaves weight to ethanol volume (1:6), extraction temperature (80° C.), extraction time (1 hour). The persimmon extraction solution is collected after completion of the continuous extraction process.

In step 4, the ethanol is recycled when the persimmon extract solution is introduced into a concentrator. The solution is concentrated under vacuum, the temperature is controlled at 60° C.~70° C. and vacuum degree is maintained at 0.06 MPa~0.08 MPa. The ratio of the volume for concentrated solution to the weight for dry persimmon leaves crushed falls in a range of 1.5:1-2:1.

In step 5, the concentrated solution is filtered. During the filtration process, the sediments are separated out and the filtrate is collected.

In step 6, the filtrate is introduced into a concentrator and is concentrated under vacuum. The filtrate is concentrated to a relative density of 1.1~1.15. The concentrated solution is then collected.

In step 7, the concentrated solution is repeatedly extracted with edible ethyl acetate for three times to produce an extraction solution. For the first extraction, the volume of ethyl acetate is three times the volume of the concentrated solution. For the second extraction, the volume of ethyl acetate is twice as much as the volume of the concentrated solution. For the third extraction, the volume of ethyl acetate is twice as much as the volume of the concentrated solution. The resultant extraction solution from the three extractions is collected.

In step 8, the ethyl acetate is recycled when the combined extraction solution is introduced into a concentrator. The extraction solution is concentrated under vacuum, temperature is controlled at 60° C.~70° C. and vacuum degree is maintained at 0.06 MPa~0.08 MPa.

In step 9, vacuum drying is utilized to dry the concentrated solution with the vacuum degree maintained at 0.08 MPa. The vacuum drying process produces a dried persimmon leaf extract.

In step 10, the dried persimmon leaf extract is crushed, blended and sifted to form a powder.

In step 11, the persimmon leaf extract is then inserted into its internal packaging. In a preferred embodiment, the internal packaging is a polyethylene (PE) bag and the extract is packaged into the PE bag in a class 100K clean room.

In step 12, the packaged persimmon leaf extract is passed through a metal detector. In a preferred embodiment, the critical limit is: iron≤0.5 mm, non-iron≤1.8 mm, stainless steel≤1.8 mm.

In step 13, the packaged persimmon leaf extract is placed inside external packaging for storage and shipment. In a preferred embodiment, the PE bag is placed into a fiber drum.

In step 14, the final product is ready for purchase and usage.

Although the above-preferred embodiments have been described with specificity, persons skilled in this art will recognize that many changes to the specific embodiments disclosed above could be made without departing from the spirit of the invention. Therefore, the attached claims and their legal equivalents should determine the scope of the invention.

What is claimed is:

1. A method for preparing a dried persimmon leaf extract, comprising the steps of:
   A. obtaining dried persimmon leaves,
   B. crushing said dried persimmon leaves,
   C. adding ethanol to said dried and crushed persimmon leaves and utilizing ethanol extraction to produce a persimmon leaf extraction solution,
   D. introducing said persimmon leaf extraction solution into a concentrator and concentrating said persimmon leaf extraction to produce a concentrated solution,
   E. filtering said concentrated solution and collecting a filtrate,
   F. introducing said filtrate into said concentrator and concentrating said filtrate to produce a second concentrated solution,
   G. extracting said second concentrated solution with ethyl acetate to produce a second persimmon leaf extract solution,
   H. introducing said second persimmon leaf extraction solution into said concentrator and concentrating said second persimmon leaf extraction solution under vacuum wherein said vacuum degree is maintained at range of approximately 0.06 MPa~0.08 MPa to produce a third concentrated solution, and
   I. utilizing vacuum drying with a vacuum degree maintained at approximately 0.08 MPa to dry said third concentrated solution to produce said dried persimmon leaf extract.

2. The method of claim 1, further comprising the steps of:
   A. crushing, blending and sifting said dried persimmon leaf extract to form a powder,
   B. inserting said powder into internal packaging,
   C. passing said powder through a metal detector, and
   D. inserting said internal packaging into external packaging.

3. The method of claim 1, wherein said second concentrated solution is repeatedly extracted three times to produce said second persimmon leaf extract solution.

4. The method of claim 1, wherein said step of adding said ethanol to said dried and crushed persimmon leaves and utilizing ethanol extraction to produce a said persimmon leaf extraction solution further comprises the steps of:
   A. placing said dried persimmon leaves into an extraction tank,
   B. adding ethanol to said extraction tank,
   C. conducting a first reflux extraction and pressing out said ethanol,
   D. adding additional ethanol to said extraction tank,
   E. conducting a second reflux extraction and pressing out said additional ethanol, and
   F. producing said persimmon leaf extraction solution by combining said first reflux extraction with said second reflux extraction.

5. The method of claim 1, wherein said step of adding said ethanol to said dried and crushed persimmon leaves and utilizing ethanol extraction to produce a said persimmon leaf extraction solution further comprises the steps of:
   A. soaking said dried persimmon leaves with ethanol,
   B. placing said soaked leaves into a dynamic counter-current extraction apparatus,
   C. adding ethanol to said dynamic counter-current extraction apparatus,
   D. conducting continuous extraction to produce said persimmon leaf extraction solution at the completion of said continuous extraction.

6. A method for preparing a dried persimmon leaf extract, comprising the steps of:
   A. obtaining dried persimmon leaves,
   B. crushing said dried persimmon leaves,
   C. adding ethanol to said dried and crushed persimmon leaves and utilizing ethanol extraction to produce a persimmon leaf extraction solution, by following the steps of:
      i. soaking said dried persimmon leaves with ethanol,
      ii. placing said soaked leaves into a dynamic counter-current extraction apparatus,
      iii. adding ethanol to said dynamic counter-current extraction apparatus,
      iv. conducting continuous extraction to produce said persimmon leaf extraction solution at the completion of said continuous extraction,
   D. introducing said persimmon leaf extraction solution into a concentrator and concentrating said persimmon leaf extraction to produce a concentrated solution,
   E. filtering said concentrated solution and collecting a filtrate,
   F. introducing said filtrate into said concentrator and concentrating said filtrate to produce a second concentrated solution,
   G. extracting said second concentrated solution with ethyl acetate to produce a second persimmon leaf extract solution,
   H. introducing said second persimmon leaf extraction solution into said concentrator and concentrating said second persimmon leaf extraction solution under vacuum wherein said vacuum degree is maintained at range of approximately 0.06 MPa~0.08 MPa to produce a third concentrated solution, and
   I. utilizing vacuum drying with a vacuum degree maintained at approximately 0.08 MPa to dry said third concentrated solution to produce said dried persimmon leaf extract.

7. A method for preparing a dried persimmon leaf extract, comprising the steps of:
   A. obtaining dried persimmon leaves, B. crushing said dried persimmon leaves,
C. adding ethanol to said dried and crushed persimmon leaves and utilizing ethanol extraction to produce a persimmon leaf extraction solution, by following the steps of:
   i. placing said dried persimmon leaves into an extraction tank,
   ii. adding ethanol to said extraction tank,
   iii. conducting a first reflux extraction and pressing out said ethanol,
   iv. adding additional ethanol to said extraction tank,
   v. conducting a second reflux extraction and pressing out said additional ethanol, and
   vi. producing said persimmon leaf extraction solution by combining said first reflux extraction with said second reflux extraction,
D. introducing said persimmon leaf extraction solution into a concentrator and concentrating said persimmon leaf extraction to produce a concentrated solution,
E. filtering said concentrated solution and collecting a filtrate,
F. introducing said filtrate into said concentrator and concentrating said filtrate to produce a second concentrated solution,
G. extracting said second concentrated solution with ethyl acetate to produce a second persimmon leaf extract solution,
H. introducing said second persimmon leaf extraction solution into said concentrator and concentrating said second persimmon leaf extraction solution under vacuum wherein said vacuum degree is maintained at range of approximately 0.06 MPa~0.08 MPa to produce a third concentrated solution, and
I. utilizing vacuum drying with a vacuum degree maintained at approximately 0.08 MPa to dry said third concentrated solution to produce said dried persimmon leaf extract.

* * * * *